(12) United States Patent
Bresso et al.

(10) Patent No.: US 11,105,422 B2
(45) Date of Patent: Aug. 31, 2021

(54) SEALING UNIT FOR FORK TUBES OF BICYCLES OR MOTORCYCLES

(71) Applicant: Aktiebolaget SKF, Gothenburg (SE)

(72) Inventors: Marco Bresso, Turin (IT); Davide Brossa, Chieri (IT); Claudio Musso, Castelnuovo Don Bosco (IT)

(*) Notice: Subject to any disclaimer, the term of this patent is extended or adjusted under 35 U.S.C. 154(b) by 108 days.

(21) Appl. No.: 16/438,600

(22) Filed: Jun. 12, 2019

(65) Prior Publication Data
US 2019/0383395 A1 Dec. 19, 2019

(30) Foreign Application Priority Data
Jun. 18, 2018 (IT) .......................... 102018000006408

(51) Int. Cl.
| | |
|---|---|
| *F16J 15/3232* | (2016.01) |
| *B62K 21/04* | (2006.01) |
| *F16F 9/36* | (2006.01) |
| *F16J 15/3276* | (2016.01) |
| *F16J 15/3284* | (2016.01) |
| *F16J 15/3224* | (2016.01) |

(52) U.S. Cl.
CPC .......... *F16J 15/3232* (2013.01); *B62K 21/04* (2013.01); *F16F 9/36* (2013.01); *F16J 15/3276* (2013.01); *F16F 9/362* (2013.01); *F16J 15/3224* (2013.01); *F16J 15/3284* (2013.01)

(58) Field of Classification Search
CPC ........ B62K 25/06; B62K 25/08; B62K 21/04; F16F 9/36; F16F 9/362; F16J 15/3232; F16J 15/3224; F16J 15/3252; F16J 15/3276
See application file for complete search history.

(56) References Cited

U.S. PATENT DOCUMENTS

| | | | | |
|---|---|---|---|---|
| 6,997,285 | B2* | 2/2006 | Downes | F16J 15/324 |
| | | | | 184/105.3 |
| 7,931,125 | B2* | 4/2011 | Downes | F16J 15/3252 |
| | | | | 184/6.18 |
| 9,120,526 | B2* | 9/2015 | Ogura | B62K 25/08 |
| 9,581,246 | B2* | 2/2017 | Kubota | F16J 15/3252 |

(Continued)

FOREIGN PATENT DOCUMENTS

| | | |
|---|---|---|
| DE | 69206173 | 5/1996 |
| EP | 2927543 | 10/2015 |

OTHER PUBLICATIONS

International Search Report for Italy Patent Application No. 102018000006406 dated Mar. 1, 2019.

*Primary Examiner* — Nicholas L Foster
(74) *Attorney, Agent, or Firm* — Reed Smith LLP

(57) ABSTRACT

A sealing unit for a fork tube provided with a lining and a stem disposed slidably inside the lining through an inlet opening. The sealing unit being mounted in the inlet opening to be slidably engaged by the stem and provided with an annular stiffening insert and a flexible annular body provided with two dust-cover lips arranged in sliding contact with the stem, and with a cylindrical static sealing element forcibly and elastically locked inside the inlet opening. The cylindrical static sealing element being radially delimited outwardly by a cylindrical assembly surface having a respective axis (X) of symmetry, which is eccentric with respect to the axis (Y) of symmetry of the first dust-cover lip to ensure a uniform sliding contact of at least the first dust-cover lip on the stem.

8 Claims, 3 Drawing Sheets

(56) References Cited

U.S. PATENT DOCUMENTS

| | | | |
|---|---|---|---|
| 2003/0019692 A1* | 1/2003 | Downes | F16J 15/3252 184/105.3 |
| 2006/0071430 A1* | 4/2006 | Downes | F16J 15/324 277/549 |
| 2006/0103075 A1* | 5/2006 | Zahn | B62K 25/08 277/436 |
| 2011/0163507 A1* | 7/2011 | Downes | F16J 15/324 277/500 |
| 2013/0001889 A1* | 1/2013 | Scaramozzino | F16J 15/56 277/561 |
| 2014/0167380 A1* | 6/2014 | Ogura | B62K 25/08 280/276 |
| 2014/0216872 A1* | 8/2014 | Kani | F16J 15/3204 188/322.16 |
| 2015/0362075 A1* | 12/2015 | Kubota | F16J 15/3216 280/276 |

\* cited by examiner

SEALING UNIT FOR FORK TUBES OF BICYCLES OR MOTORCYCLES

CROSS-REFERENCE TO RELATED APPLICATIONS

This application claims priority to Italian patent application no. 102018000006408 filed on Jun. 18, 2018, the contents of which are fully incorporated herein by reference.

FIELD OF THE INVENTION

The present invention relates to a sealing unit for fork tubes of bicycles or motorcycles.

More particularly, the sealing unit or gasket has a "dust-cover" function, namely it protects the application, in this case the fork tube, from external contaminants. The sealing unit is designed to improve during use the constant contact of the sealing lips on the stem of the fork tube.

A fork tube of bicycles or motorcycles will be described by way of example, the design of the present sealing unit being able to be used also for other types of application where a similar improvement in the performance is required.

BACKGROUND OF THE INVENTION

The fork tubes for motorcycles comprise an outer lining and a stem sliding inside the lining and introduced inside the latter through an inlet opening. The sliding movement is enabled by two sliding bushes arranged between the stem and the lining. Lubrication of the bushes is performed by the oil which is introduced between the lining and the stem and inside which the stem slides. This cavity is closed outwardly by a sealing unit mounted on the lining around the inlet opening situated on the edge of the lining and passed through by the stem.

It is known that the fork tube of a bicycle or a motorcycle always operates with an incorrect radial alignment. In fact, the misalignment is due to the load acting on the fork tube and transmitted by the vehicle or the rider or in any case by dynamic conditions affecting the suspension. Since the fork tube is not mounted in the vertical position, a component of the load acting on the fork tube therefore creates a misalignment between the stem and the outer lining of the fork tube.

The sealing units of the known type for fork tubes of bicycles or motorcycles are axially symmetric and consequently work under the same symmetry conditions. In the light of the above considerations, therefore, the sealing units of the known type may have difficulty following the dynamics of the fork tube stem. As a result, their function of ensuring a sealing action against contaminants from the external environment is negatively affected. The entry of the dust inside the fork creates problems in two respects. Firstly, the dust will cause damage or even breakage of the sealing lips of the seal with a consequent loss of lubrication oil. Secondly, as a consequence of the first problem, the loss of oil will result in damage to or faulty operation of the internal components and therefore failure to ensure the necessary performance characteristics.

A known solution to this type of problem is that of reducing the internal diameter of the sealing unit so as to increase the radial load thereof transmitted by the stem and ensure the sealing action also in the frequent situations of radial misalignment. As may be understood, however, this solution results in unsuitable working conditions for the sealing lips with a consequent increase in the passive resistance due to the friction.

There therefore exists the need to design a sealing unit for fork tubes of bicycles or motorcycles which is able to solve these problems of misalignment with the fork tube stem and which does not have the aforementioned drawbacks.

BRIEF SUMMARY OF THE INVENTION

A first primary object of the present invention is to provide a sealing unit which is able to performs its sealing function with regard to external contaminants in any operating condition. The object is achieved by compensating for the radial misalignment of the fork tube stem by means of an asymmetrical design of the seal. In fact, by designing an asymmetrical sealing unit, the sealing lips may follow more easily the misalignment of the fork tube stem. In particular, the axis of the sealing lips does not coincide with the axis of the sealing unit relative to its outer diameter and therefore with the axis of the fork tube and the stem. Thus, this offset arrangement compensates for the misalignment created by the radial load.

According to another object of the present invention at least one first sealing lip may have a thickness which is not constant. For example, the lip may have a greater thickness over an angular amplitude of about 180°, while in the remaining 180° it will have a smaller thickness. This characteristic helps reduce the effects of misalignment of the radial load precisely in the angular sector where this misalignment occurs. In the remaining angular sector, opposite to that where the misalignment occurs, the lip with a smaller thickness will help reduce the passive resistance due to friction.

Clearly an asymmetrical sealing unit may be provided with a suitable protrusion along its radially outer edge, in order to ensure a correct orientation of the seal during assembly on the fork tube.

These and other objects and advantages are achieved, according to the invention, by a sealing unit for a fork tube of a bicycle or motorcycle having the characteristic features described in the attached independent claim.

Further preferred and/or particularly advantageous embodiments of the invention are described in accordance with the characteristic features indicated in the attached dependent claims.

BRIEF DESCRIPTION OF THE SEVERAL VIEWS OF THE DRAWING

The invention will now be described with reference to the accompanying drawings which illustrate a non-limiting example of embodiment thereof, in which.

DETAILED DESCRIPTION OF THE INVENTION

Figure 1:
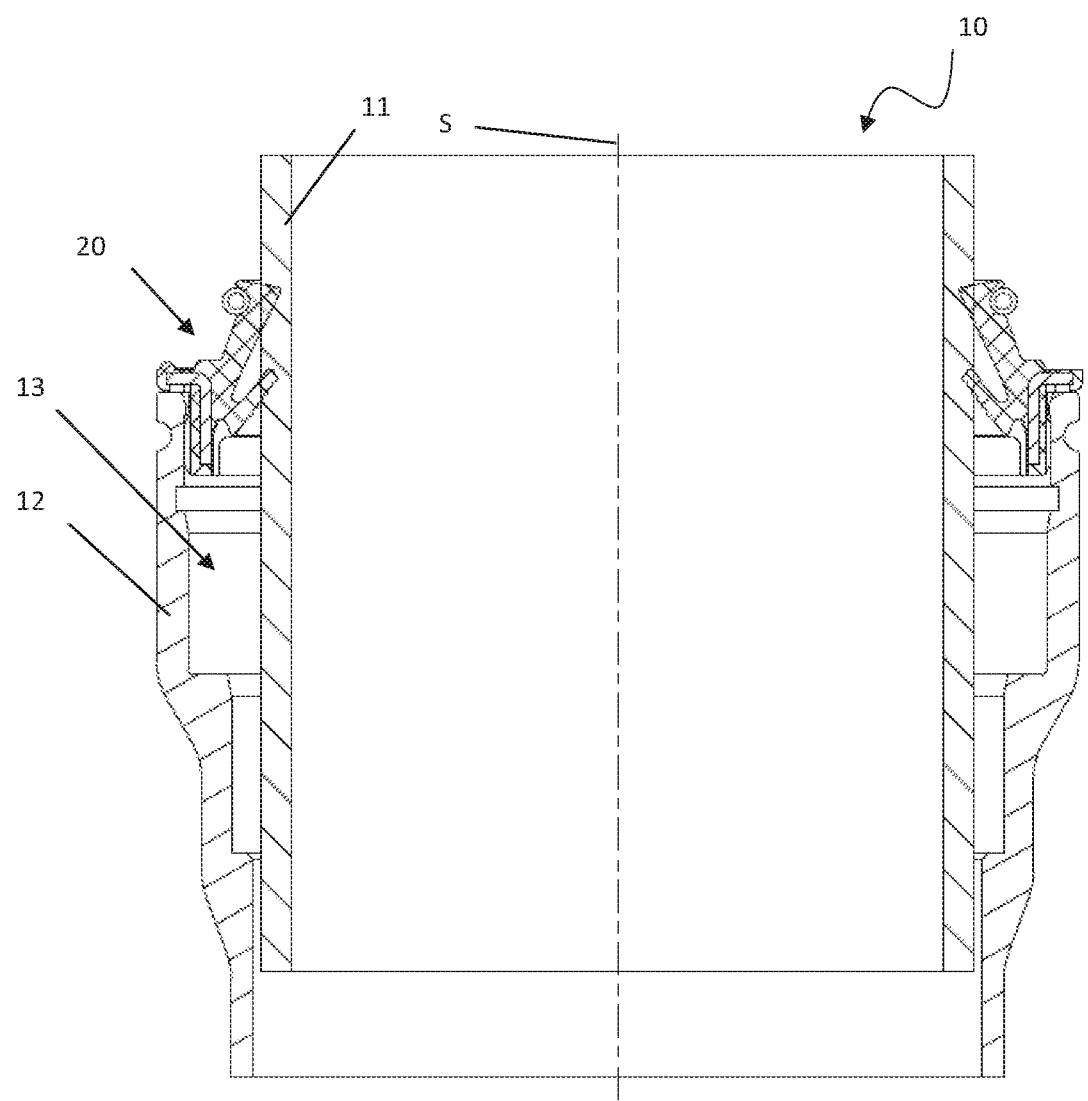
FIG. 1 is a longitudinally sectioned view of a sealing unit mounted on a fork tube of a bicycle or motorcycle fork according to an embodiment of the present invention.
Figure 2:
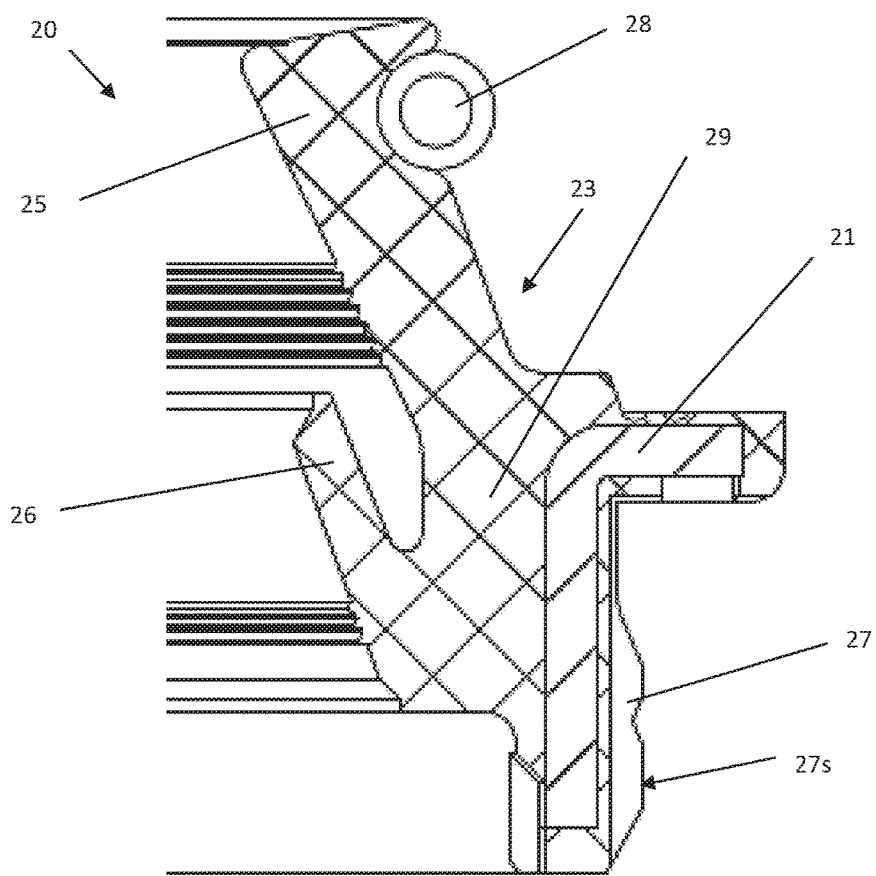
FIG. 2 is a detail, on a larger scale, of the sealing unit according to FIG. 1.

With reference now to FIGS. 1 and 2, the number 10 denotes in its entirety a fork tube of a bicycle or motorcycle fork, provided with a sealing unit 20.

In the most common applications the fork tube 10 is intended to form a fork for a bicycle or motorcycle, including two parallel fork tubes which can be connected to the steering tube of the bicycle or motorcycle by means of two plates.

The fork tube 10 comprises two coaxial tubes 11 and 12 about an axis S of symmetry, which are telescopically slidable inside each other and, in the continuation of the present description, these tubes are referred to as "stem 11" (radially inner tube) and "lining 12" (radially outer tube). The lining 12 is provided with an axially outer inlet opening 13 for introduction of the stem 11 which is slidable inside the lining 12.

The sealing unit 20 is locked inside the inlet opening 13 of the lining 12 and includes an annular stiffening insert 21 and an annular body 23 made of elastically flexible material. The annular insert 21, which in this example has a flanged cylindrical section, acts as a support element for the flexible annular body 23 and as a reinforcement for supporting the axial loads to which the sealing unit is subject during operation thereof. On the axially outer side of the stiffening ring 21, the annular body 23 made of elastically flexible material (for example rubber) forms a first conical dust-cover lip 25 with a dynamic sealing function, arranged on the outside of the inlet opening 13 and converging in an axially outer and radially inner direction so as to make sliding contact with the stem 11. According to a preferred embodiment, the first dust-cover lip 25 is gripped in the radially inner direction by a circumferential spring 28 positioned inside a groove formed in a radially outer surface of the lip 25. A second lip 26, which also has a dynamic sealing function, extends from a common root 29 towards the first dust-cover lip 25, is arranged axially on the inside of the first lip 25 and the inlet opening 13 and, like the first lip 25, converges in an axially outer and radially inner direction so as to make sliding contact with the stem 11.

The flexible annular body 23 also forms a cylindrical static sealing element 27 which is radially delimited outwardly by a cylindrical surface 27s and is locked forcibly and elastically inside the inlet opening 13 of the lining 12, between the annular stiffening insert 21 and the lining 12.

Figure 3:
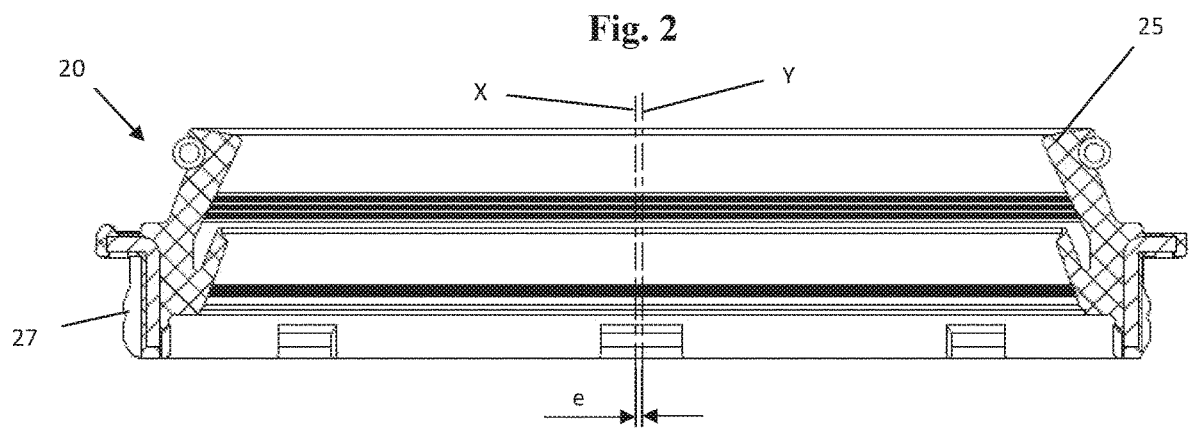
FIG. 3 is a longitudinally sectioned view of the sealing unit according to FIG. 1 in which the misalignment between the sealing unit and the fork tube is visible.

With reference now to FIG. 3, the sealing unit 20 is shown in a longitudinally sectioned view which illustrates the asymmetry of the sealing unit 2, more particularly the eccentricity "e" between the axis X of symmetry of the sealing unit 20 relative to its radially outer diameter, namely that which delimits the cylindrical static sealing element 27, and the axis Y of symmetry of the first dust-cover lip 25. According to the example shown in FIG. 3, this eccentricity "e" has a value of 0.3 mm. With this asymmetrical design of the sealing unit, the first dust-cover lip 25 and the second lip 26 may follow more easily the misalignment of the stem 11. In particular, the axis of the sealing lips does not coincide with the outer axis of the seal and therefore with the axis of the stem. Thus, this offset arrangement compensates for the misalignment created by the radial load.

Figure 4:
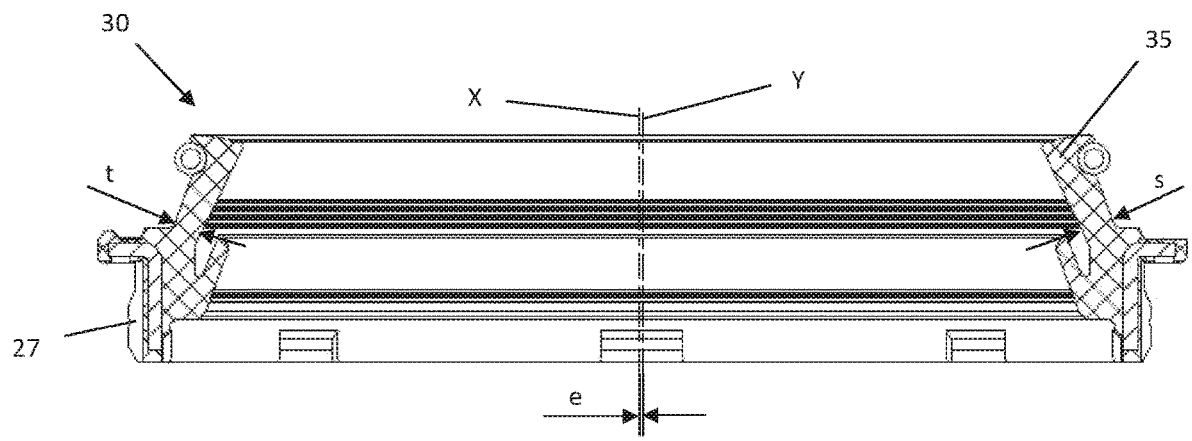
FIG. 4 is a longitudinally sectioned view of a sealing unit for fork tubes of bicycle or motorcycle forks according to an alternative embodiment of the present invention, in which a smaller misalignment between the sealing unit and the fork tube and a non-uniform thickness of a first sealing lip are visible.
Figure 5:
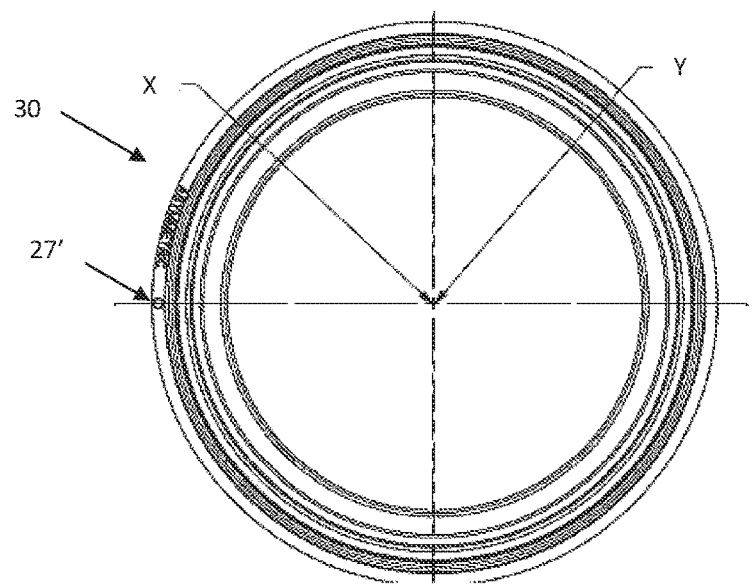
FIG. 5 shows a plan view of the sealing unit according to FIG. 4 in which a protrusion for the correct orientation of the sealing unit during assembly is visible.

With reference to FIGS. 4 and 5, this shows a sealing unit 30 according to an alternative embodiment of the present invention. According to this embodiment the sealing unit still has an eccentricity "e" between the axis X of symmetry the sealing unit 30 relative to its radially outer diameter, namely that which defines the cylindrical static sealing element 27, and the axis Y of symmetry of the first dust-cover lip 35. In this case, however, the eccentricity is smaller and has a value of 0.15 mm. Furthermore, according to this embodiment, the first dust-cover lip 35 may have a non-uniform thickness. In the example shown in FIG. 4, the lip 35 may have a greater thickness "s" over an angular amplitude of about 180°, for example equal to 1.8 mm, while in the remaining 180° it will have a smaller thickness "t", for example equal to 1.6 mm. This characteristic helps reduce the effects of misalignment of the radial load precisely in the angular sector where this misalignment occurs. In the remaining angular sector, opposite to that where the misalignment occurs, the lip with a smaller thickness will help reduce the passive resistance due to friction. In fact, depending on the assembly angle of the fork, the sealing unit works in different ways. In particular, the working action of the sealing portion located at the front of the fork is different from the sealing portion located at the rear of the fork, the terms "front" and "rear" being defined with reference to the direction of travel of the motorcycle.

Therefore, it is possible to overcome the drawbacks of the sealing unit according to the prior art by modifying the asymmetry of the seal and optionally also the thickness of the first dust-cover lip. The structural calculations carried out as well as the series of experimental tests performed have shown that the value of the eccentricity "e" between the axis X of the sealing unit relative to its outer diameter, and the axis Y of the first dust-cover lip must not be greater than 0.5 mm. This range, depending on the load conditions of the application, is defined by the compromise between sealing action/friction resistance. By means of the same calculations it has been possible to define also the ratio between the thicknesses s and t of the first dust-cover lip 35: this ratio is suitable if the following condition exists:

$$1.05 < s/t < 1.3$$

Finally, with reference to FIG. 5, it is clear that the asymmetrical sealing unit 20, 30 may be provided with a suitable protrusion 27' formed along its radially outer edge. In this way it will be easy and straightforward to orient correctly the seal during its assembly on the fork tube.

Therefore, by means of the present invention, and in particular owing to the asymmetrical design of the sealing unit, it is possible to ensure that the dust-cover lip always works correctly on the stem according to the design conditions.

Moreover, owing to the different thickness of the dust-cover lip, it is ensured that the lip works correctly on the more disadvantageous side, where it has a greater thickness able to withstand a greater stressing action. At the same time, the overall friction is reduced since on the other side, namely over the remaining 180°, the lip with a smaller thickness creates a smaller friction resistance.

Overall the two characteristics described (asymmetry and variable thickness) improve the capacity of the sealing unit to "follow" the stem and therefore ensure a better sealing action in respect of external contaminants.

In addition to the embodiments of the invention, as described above, it is to be understood that numerous further variants are possible. It must also be understood that the embodiments are only examples and do not limit the subject of the invention, nor its applications, nor its possible configurations. On the contrary, although the description provided above enables the person skilled in the art to implement the present invention at least in one of its examples of configuration, it must be understood that numerous variations of the components described are feasible, without thereby departing from the scope of the invention, as defined in the accompanying claims, interpreted literally and/or in accordance with their legal equivalents.

What is claimed is:

1. A sealing unit configured for a fork tube of a bicycle or motorcycle fork, the fork tube having an inner tube and an outer tube, the inner tube configured for sliding along a sliding axis of the outer tube, the outer tube provided with an inlet opening between the inner tube and the outer tube configured for providing an entrance inside the outer tube; the sealing unit configured to be mounted in the inlet opening so as to be slidably engaged by the inner tube, the sealing unit comprising:
   an annular insert for stiffening; and
   a flexible annular body comprising:
      two dust-cover lips, which depart from a common root of the annular body and, converging in an axially outer and radially inner direction, are configured to be arranged in sliding contact with the inner tube; a first lip of the two dust-cover lips being configured to be arranged outside the inlet opening and a second lip of the two dust-cover lips being configured to be arranged axially on the inside of the first lip and the inlet opening; and
      a cylindrical static sealing element, configured to be forcibly and elastically locked in the inlet opening between the annular stiffening insert and the outer tube;
   wherein the cylindrical static sealing element is radially delimited outwardly by a cylindrical mounting surface having an axis (X) of symmetry that is eccentric with respect to an axis (Y) of symmetry of the first dust-cover lip prior to mounting of the seal unit in the inlet opening so as to be configured to provide a constant sliding contact of at least the first dust-cover lip on the inner tube when the seal unit is mounted in the inlet opening.

2. The sealing unit according to claim 1, wherein the value of the eccentricity (e) between the axis (X) of symmetry of the cylindrical static sealing element and the axis (Y) of symmetry of the first dust-cover lip is less than 0.5 mm.

3. The sealing unit according to claim 1, wherein the eccentricity (e) has a value equal to 0.3 mm.

4. The sealing unit according to claim 1, wherein the eccentricity (e) has a value equal to 0.15 mm.

5. The sealing unit according to claim 1, further comprising a protrusion formed along an axially and radially outer edge of the sealing unit, the protrusion being configured to correctly orientate the sealing unit during its assembly on the fork tube.

6. A sealing unit configured for a fork tube of a bicycle or motorcycle fork, the fork tube having an inner tube and an outer tube, the inner tube configured for sliding along a sliding axis of the outer tube, the outer tube provided with an inlet opening between the inner tube and the outer tube configured for providing an entrance inside the outer tube; the sealing unit configured to be mounted in the inlet opening so as to be slidably engaged by the inner tube, the sealing unit comprising:
   an annular insert for stiffening; and
   a flexible annular body comprising:
      two dust-cover lips, which depart from a common root of the annular body and, in an axially outer and radially inner direction, are configured to be arranged in sliding contact with the inner tube; a first lip of the two dust-cover lips being configured to be arranged outside the inlet opening and a second lip of the two dust-cover lips being configured to be arranged axially on the inside of the first lip and the inlet opening; and
      a cylindrical static sealing element, configured to be forcibly and elastically locked in the inlet opening between the annular stiffening insert and the outer tube;
   wherein the cylindrical static sealing element is radially delimited outwardly by a cylindrical mounting surface having an axis (X) of symmetry that is eccentric with respect to an axis (Y) of symmetry of the first dust-cover lip so as to be configured to provide a constant sliding contact of at least the first dust-cover lip on the inner tube;
   wherein the value of the eccentricity (e) between the axis (X) of symmetry of the cylindrical static sealing element and the axis (Y) of symmetry of the first dust-cover lip is less than 0.5 mm;
   wherein the first dust-cover lip has a first thickness (s), over an angular sector of about 180°, greater than a second thickness (t) of the remaining angular sector of about 180°, and the ratio between the first thickness (s) and the second thickness (t) is included in an interval such that:

$$1.05 < s/t < 1.3$$

7. The sealing unit according to claim 6, wherein the first thickness (s) is equal to 1.8 mm and the second thickness (t) is equal to 1.6 mm.

8. A fork tube of a bicycle or motorcycle fork, the fork tube comprising:
   an inner tube; and
   an outer tube, the inner tube configured for sliding along a sliding axis of the outer tube;
   an inlet opening between the inner tube and the outer tube configured for providing an entrance inside the outer tube;
   a sealing unit configured to be mounted in the inlet opening so as to be slidably engaged by the inner tube, the sealing unit comprising:
      an annular insert for stiffening; and
      a flexible annular body comprising:
         two dust-cover lips, which depart from a common root of the annular body and, in an axially outer and radially inner direction, are configured to be arranged in sliding contact with the inner tube; a first lip of the two dust-cover lips being configured to be arranged outside the inlet opening and a second lip of the two dust-cover lips being configured to be arranged axially on the inside of the first lip and the inlet opening; and
         a cylindrical static sealing element, configured to be forcibly and elastically locked in the inlet opening between the annular stiffening insert and the outer tube;
      wherein the cylindrical static sealing element is radially delimited outwardly by a cylindrical mounting surface having an axis (X) of symmetry that is eccentric with respect to an axis (Y) of symmetry of the first dust-cover lip prior to mounting of the seal unit in the inlet opening so as to be configured to provide a constant sliding contact of at least the first dust-cover lip on the inner tube when the seal unit is mounted in the inlet opening.

* * * * *